United States Patent
Bhalgat et al.

(10) Patent No.: US 10,445,788 B2
(45) Date of Patent: Oct. 15, 2019

(54) DETERMINING A REGRET METRIC FOR ADVERTISEMENT CAMPAIGNS

(71) Applicant: Facebook, Inc., Menlo Park, CA (US)

(72) Inventors: Anand Sumatilal Bhalgat, Mountain View, CA (US); Subha Ramakrishna Gummadi, Palo Alto, CA (US); Chandrashekhar Nagarajan, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 490 days.

(21) Appl. No.: 14/941,329

(22) Filed: Nov. 13, 2015

(65) Prior Publication Data

US 2017/0140438 A1     May 18, 2017

(51) Int. Cl.
*G06Q 30/02*     (2012.01)
*G06Q 30/00*     (2012.01)

(52) U.S. Cl.
CPC ..... *G06Q 30/0275* (2013.01); *G06Q 30/0246* (2013.01); *G06Q 30/0249* (2013.01)

(58) Field of Classification Search
CPC ........... G06Q 30/0242; G06Q 30/0244; G06Q 30/0275; G06Q 30/0246; G06Q 30/0249
See application file for complete search history.

(56) References Cited

U.S. PATENT DOCUMENTS

| | | | | |
|---|---|---|---|---|
| 9,218,611 | B1* | 12/2015 | Lei | G06Q 30/0244 |
| 10,282,758 | B1* | 5/2019 | Els | G06Q 30/0275 |
| 2003/0105677 | A1* | 6/2003 | Skinner | G06Q 30/02 705/26.1 |
| 2010/0262497 | A1* | 10/2010 | Karlsson | G06Q 30/02 705/14.71 |
| 2011/0231264 | A1* | 9/2011 | Dilling | G06Q 30/02 705/14.71 |
| 2012/0078730 | A1* | 3/2012 | Ramaiyer | G06Q 30/0275 705/14.71 |
| 2012/0310729 | A1* | 12/2012 | Dalto | G06Q 30/02 705/14.43 |
| 2014/0058827 | A1* | 2/2014 | Svirsky | G06Q 30/02 705/14.43 |
| 2015/0134463 | A1* | 5/2015 | Jalali | G06Q 30/0275 705/14.71 |

* cited by examiner

*Primary Examiner* — Luis A Brown
*Assistant Examiner* — Robert C Johnson
(74) *Attorney, Agent, or Firm* — Fenwick & West LLP (57) ABSTRACT

An advertising ("ad") system allows users to specify a budget for an advertisement ("ad") campaign including ad requests ("ads"), and the ad system automatically determines bids on a per-impression basis to pace the ad spend according to the budget. The ad system computes a "regret" metric for the ad campaign, which is the total amount over the course of the ad campaign that the advertiser had to pay for presenting an ad above the ideal bid (e.g., the bid that would have captured at least a threshold number of the lowest priced impressions during the ad campaign's life while spending the budget). The ad system may use the regret metric to indicate the performance of the ad campaign, e.g., as feedback for the advertiser.

18 Claims, 3 Drawing Sheets

DETERMINING A REGRET METRIC FOR ADVERTISEMENT CAMPAIGNS

BACKGROUND

This invention relates generally to presenting content via advertising systems, and more specifically to tracking monetary performance of the presented content.

An advertising ("ad") system, such as an online or social networking system, allows its users to connect to and communicate with other ad system users. Users may create profiles on an ad system that are tied to their identities and include information about the users, such as interests and demographic information. The users may be individuals or entities such as corporations or charities. Because of the increasing popularity of ad systems and the increasing amount of user-specific information maintained by ad systems, an ad system provides an ideal forum for entities to increase awareness about products or services by presenting content items to ad system users.

Presenting content items to ad system users allows an entity to gain public attention for products or services or to persuade users to take an action regarding the entity's products or services. Additionally, many ad systems generate revenue by displaying certain content items to their users. Frequently, ad systems charge entities for each presentation of certain types of content items to an ad system user (e.g., each "impression" for the certain types of content items) or for each interaction with or related to certain types of content items by an ad system user (e.g., each "click" or each "conversion"). Entities being charged for presentation of content items associated with their campaigns oftentimes cannot track performance of their content items while they are being charged. Therefore, even though content items from the ad campaign are being presented and entities will know if a budget for presenting the content items in their campaigns has been spent, entities do not know how their content items perform on a pre-impression basis while the budget is being spent and how often they may be overpaying for impressions.

SUMMARY

To better show performance of ads to advertisers on a per-impression basis and whether the advertiser is overpaying for impressions, an ad system, such as an online or social networking system, computes a regret metric representing how much the advertiser paid over an ideal amount. The ad system receives information describing an advertisement campaign ("ad campaign") including one or more advertisement requests ("ad requests") from an advertiser for presentation of ads to users of the ad system. Each ad request can include an ad creative or content of the ad to be presented to an ad system user, a budget for the ad campaign (e.g., an amount of money an advertiser would like to spend in presenting to users ads included in the ad campaign), and a lifetime of the ad campaign (e.g., how long the ad campaign should last). Based on the ad request, the ad system can automatically determine, on a per-impression basis, appropriate bid amounts to be provided to an ad selection process for selection of an ad to present to a user (e.g., for an impression), and the bid amounts can be determined in a manner that paces the amount spent according to the advertiser's budget. For example, the bid amount for the ad can be determined based on the budget and/or lifetime of the ad campaign specified by the advertiser or based on other information the system has about the advertisement campaign or advertiser (or based on information the system has in general about other ad campaigns and bid amounts typically used). In one embodiment, the bid amount is determined using a pacing algorithm or pacing multiplier to pace out the advertiser's budget over a time period such that it is not immediately depleted at the start of the advertisement campaign.

The bid amount can be determined by the system as each impression opportunity presents itself (e.g., a user to whom the ad could be displayed becomes available for receiving an ad). Each ad being considered for an impression opportunity is entered in an ad selection process or ad auction with the associated bid amount. The ad selection process selects one or more winning ads from a group of ads associated with the highest bid amounts. For example, the ad selection process can be an auction process and the ad can be entered into the auction to be selected for presentation to one or more users based on targeting criteria or other suitable information describing presentation of an ad creative in the ad matching the one or more users. Then, one or more ads in the auction process are selected or "win" the auction process based on bid amounts associated with the one or more ads.

For the ads winning the ad selection process with the associated bid amounts, the ad system determines a regret metric for the ad campaign. The regret metric represents how much the advertiser had to pay over an ideal amount. For example, the regret metric can be computed as the average amount that the advertiser had to pay for presenting the ad (based on the bid amounts the system determined) over the ideal bid or over an amount the advertiser would have had to pay had the system provided an ideal bid. The ideal bid is one that allows for an ideal spending of an advertiser's budget across the course of an ad campaign. For example, the ideal bid may be a bid that would have captured all of (or some number or percentage of) the lowest priced impressions during the lifetime of the campaign while still perfectly (or nearly perfectly) spending the budget. The regret metric can be also be used to determine as a monetary amount the inefficiency of a bid pacing algorithm in determining the optimal bid for each impression opportunity for an ad.

The system may use the regret metric to indicate the performance of the ad campaign, e.g., as feedback for the advertiser. Advertisers can view performance of their ad campaigns and ads on a per-impression basis with the regret metric. For example, since the regret metric for an advertiser is a monetary amount directly reflecting how much over an ideal amount the advertiser paid, advertisers can be presented with or have access to their regret metrics for various ad campaigns allowing for per impression or per auction based updates of their ad campaigns' progress.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
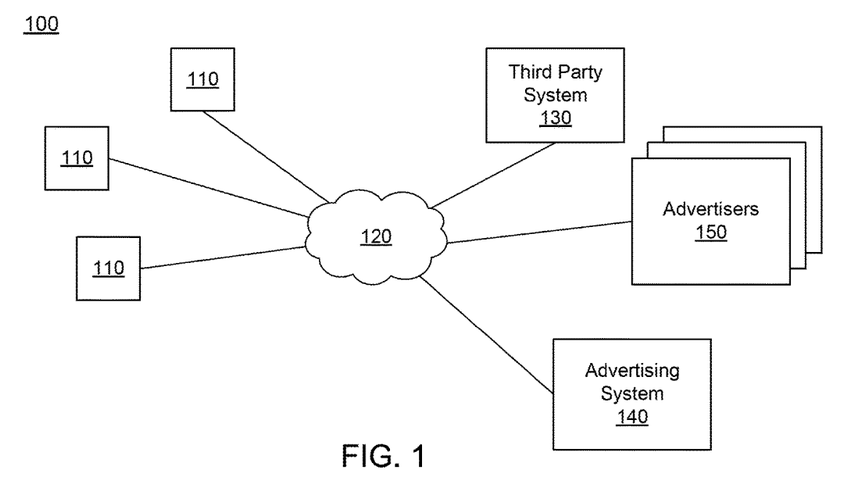
FIG. 1 is a block diagram of a system environment in which an advertising system operates, in accordance with an embodiment.

FIG. 1 is a high level block diagram of a system environment 100 for an advertising ("ad") system 140. The system environment 100 shown by FIG. 1 comprises one or more client devices 110, a network 120, one or more third-party systems 130, the ad system 140, and one or more advertisers 150. In alternative configurations, different and/or additional components may be included in the system environment 100. The embodiments described herein can be adapted to other suitable online systems, such as social networking systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the ad system 140. For example, a client device 110 executes a browser application to enable interaction between the client device 110 and the ad system 140 via the network 120. In another embodiment, a client device 110 interacts with the ad system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more advertisers 150 are coupled to the network 120. The advertiser 150, which may be embodied as a device of an advertising entity (e.g., a server hosted by an online advertising entity, a mobile device used by an advertiser, etc.), communicates with the advertising system 140, which is further described below in conjunction with FIG. 2. In one embodiment, the advertiser 150 is an application provider communicating information describing applications for execution by a client device 110 or communicating data to client devices 110 for use by an application executing on the client device. An advertiser 150 may communicate information to the advertising system 140, such as advertisements, content, or information for publication to one or more client devices 110.

One or more third party systems 130 may be coupled to the network 120 for communicating with the ad system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party website 130 may also communicate information to the ad system 140, such as advertisements, content, or information about an application provided by the third party website 130.

Figure 2:
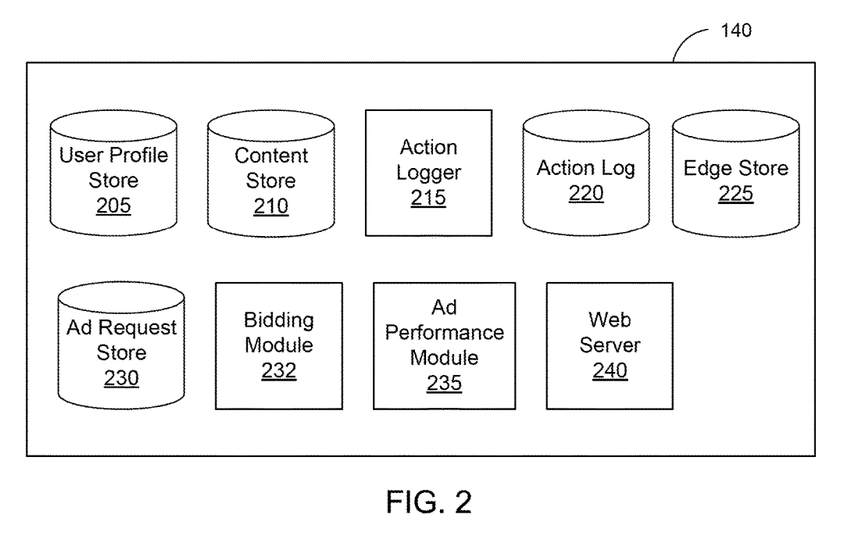
FIG. 2 is a block diagram of an advertising system, in accordance with an embodiment.

FIG. 2 is an example block diagram of an architecture of the ad system 140. The ad system 140 shown in FIG. 2 includes a user profile store 205, a content store 210, an action logger 215, an action log 220, an edge store 225, advertisement ("ad") request store 230, a bidding module 232, an advertisement ("ad") performance module 235, and a web server 240. In other embodiments, the ad system 140 may include additional, fewer, or different components for various applications. Conventional components such as network interfaces, security functions, load balancers, failover servers, management and network operations consoles, and the like are not shown so as to not obscure the details of the system architecture.

Each user of the ad system 140 is associated with a user profile, which is stored in the user profile store 205. A user profile includes declarative information about the user that was explicitly shared by the user and may also include profile information inferred by the ad system 140. In one embodiment, a user profile includes multiple data fields, each describing one or more attributes of the corresponding user of the ad system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the ad system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the ad system 140, user profiles may also be stored for entities such as businesses or organizations. This allows an entity to establish a presence on the ad system 140 for connecting and exchanging content with other ad system users. The entity may post information about itself, about its products or provide other information to users of the ad system 140 using a brand page associated with the entity's user profile. Other users of the ad system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Ad system users may create objects stored by the content store 210, such as status updates, photos tagged by users to be associated with other objects in the ad system, events, groups or applications. In some embodiments, objects are received from third-party applications or third-party applications separate from the ad system 140. In one embodiment, objects in the content store 210 represent single pieces of content, or content "items." Hence, users of the ad system 140 are encouraged to communicate with each other by posting text and content items of various types of media through various communication channels. This increases the amount of interaction of users with each other and increases the frequency with which users interact within the ad system 140.

The action logger 215 receives communications about user actions internal to and/or external to the ad system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the ad system 140 to track user actions on the ad system 140, as well as actions on third party systems 130 that communicate information to the ad system 140. Users may interact with various objects on the ad system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the ad system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the ad system 140 as well as with other applications operating on the ad system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the ad system 140. For example, an e-commerce website that primarily sells sporting equipment at bargain prices may recognize a user of an ad system 140 through a social plug-in enabling the e-commerce website to identify the user of the ad system 140. Because users of the ad system 140 are uniquely identifiable, e-commerce websites, such as this sporting equipment retailer, may communicate information about a user's actions outside of the ad system 140 to the ad system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the ad system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the ad system 140, such as expressing interest in a page on the ad system 140, sharing a link with other users of the ad system 140, and commenting on posts made by other users of the ad system 140.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the ad system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the ad system 140 over time to approximate a user's affinity for an object, interest, and other users in the ad system 140 based on the actions performed by the user. A user's affinity may be computed by the ad system 140 over time to approximate a user's affinity for an object, interest, and other users in the ad system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more ad requests are included in the ad request store 230. These ad requests can form a part of an advertisement campaign received by the ad system 140 for an advertiser. An ad request includes advertisement content and can also include a bid amount. The advertisement content is text, image, audio, video, or any other suitable data presented to a user. This is also referred to herein as an ad creative. In various embodiments, the advertisement content also includes a landing page specifying a network address to which a user is directed when the advertisement is accessed. The bid amount is associated with an ad request and is used to determine an expected value, such as monetary compensation, provided by an advertiser to the ad system 140 if the ad is presented to a user, if the ad receives a user interaction, or based on any other suitable condition. For example, the bid amount relates to a monetary amount that the ad system 140 receives from the advertiser if the ad is displayed and the expected value is determined by multiplying the bid amount or an amount the advertiser paid by a probability of the ad being accessed.

Additionally, an ad request may include one or more targeting criteria specified by the advertiser. Targeting criteria included in an ad request specify one or more characteristics of users eligible to be presented with content in the ad request. For example, targeting criteria are a filter to apply to fields of a user profile, edges, and/or actions associated with a user to identify users having user profile information, edges or actions satisfying at least one of the targeting criteria. Hence, the targeting criteria allow an advertiser to identify groups of users matching specific targeting criteria, simplifying subsequent distribution of content to groups of users.

In one embodiment, the targeting criteria may specify actions or types of connections between a user and another user or object of the ad system 140. The targeting criteria may also specify interactions between a user and objects performed external to the ad system 140, such as on a third party system 130. For example, the targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in the targeting criteria allows advertisers to further refine users eligible to be presented with content from an advertisement request. As another example, targeting criteria may identify users having a connection to another user or object or having a particular type of connection to another user or object.

The bidding module 232 determines the appropriate bid to submit to an ad selection process for each impression opportunity that becomes available for an ad campaign. As a user becomes available on a system for presentation of an ad, the ad system 140 conducts an ad selection process, such as an ad auction, to select an ad to provide for display to the user. For each impression opportunity, the bidding module 232 determines the appropriate bid amount and enters the ad with the bid amount into the auction. As explained above, the bid amount can be determined using a pacing algorithm that paces the advertiser's budget across a time period such as across a day or a few days, or across a lifetime of the ad campaign.

The bidding module 232 may determine a bid for the ad based on the ad's constraints and goals, the historical statistics for the ad, predicted ad performance, among other factors. The ad selection process receives the ads being considered for the impression opportunity along with the bids submitted by the bidding module 232, and the ad selection process makes a selection of the ad to provide for the user. It may simply select the ad associated with the highest bid, or may select an ad based on other criteria as well, such as the context of the ad, the identity of the advertiser requesting the ad, or any other suitable criteria. This automated form of bidding precludes the need for advertisers to manually submit bids for ads, instead allowing an advertiser to merely set an ad's budget, plus other goals and constraints. Once ads and ad information are uploaded, bids are then determined without direct or explicit action by the advertisers. The system then paces out the budget of the advertiser across a period of time. More information about budget-based bidding is included in U.S. patent application Ser. No. 13/294,094, filed Nov. 10, 2011, which is incorporated by reference in its entirety. The amount that the advertiser ultimately pays to the ad system for presentation of the ad can be the amount bid or a number tied to the amount bid. In some embodiments, the amount paid is the amount of the next highest bid after the winning bid, or is some number related to the next highest bid, such as a number just above or just below the next highest bid, or within a threshold distance of the next highest bid.

Figure 4:
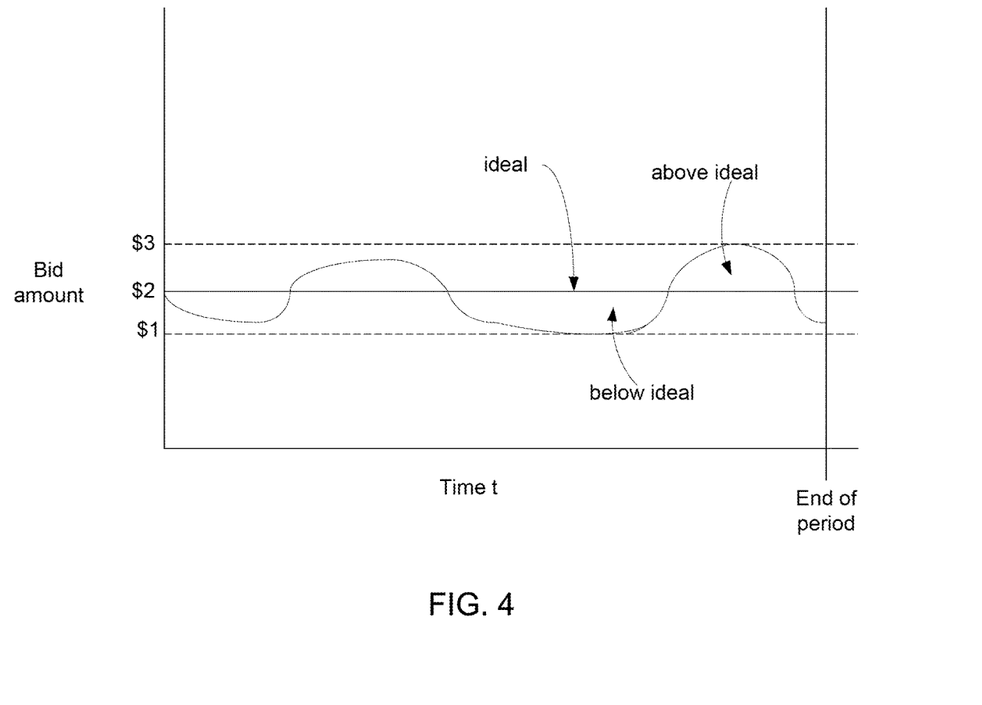
FIG. 4 is an example graphical representation of bidding below and above an ideal bid amount during a period of time in an ad campaign for illustration of calculation of a regret metric.

In using paced or budget-based bidding, the bidding module 232 may try out different bids for impression opportunities, since the module does not know for example that $2 is the optimal/ideal bid or equilibrium. See FIG. 4 as one example illustrating this. The bidding module 232 may try bids of up to $3 and down to $1. When bidding higher (e.g., $3) than the ideal pacing multiplier, the advertiser then wins at a more expensive price spending more of the advertiser's budget, but the system then misses cheaper impression opportunities that would have won. For example, the system may exhaust the entire budget with more expensive clicks when cheaper clicks were available. In addition, certain auctions are lost because too little was bid (e.g., $1), when the ideal bid ($2) would have won the auction.

The ad performance module 235 accesses ad campaigns of advertisers and performance information of those ad campaigns from the ad request store 230. Performance information of an ad campaign includes bid amounts associated with ads in the ad campaign entered in ad selection processes and monetary amounts paid by the advertiser associated with those ad selection processes. Based on the performance information of an ad campaign, the ad performance module 235 determines a regret metric for the ad campaign across the impression opportunities in which the ad won the ad selection process. A regret metric of an advertiser is a total monetary amount indicating how much an advertiser paid for each presentation of the ad over an ideal amount. In one embodiment, the regret metric is represented as a sum of the amounts that the advertiser had to pay for displaying an ad above the ideal bid or above an amount the advertiser would have had to pay if an ideal bid had been used. In other words, the regret metric considers each time an advertiser had to pay more for an impression than he would have had to pay had an ideal bid been used, and presents this as a sum of the prices the advertiser had to pay in each of these instances. The ideal bid is the bid that would have captured all of the lowest priced impressions during the campaign's life while spending the budget perfectly or near perfectly (or while spending the budget within a threshold distance of perfectly, such as within 0.001% of perfectly, or some other percentage, such as 0.01%, 0.1%, 0.5%, 1%, 2%, 5%, etc.). In some embodiments, the ideal bid is the bid that would have not necessarily captured all, but captured a majority of the lowest priced impressions, or would have captured at least a threshold number of the lowest priced impressions, such as at least 80%, 85%, 90%, 95%, 98%, 99%, 99.5%, etc. The best scenario for the advertiser is to set the advertiser's bids just high enough to exhaust his budget while still avoiding overpaying for impressions throughout the course of a day, which may cause the advertiser to spend the full budget before a number of lower priced impressions become available later in the day. The regret metric measures when overbidding occurs, but does so in terms of the price that the advertiser had to pay.

In some embodiments, the regret metric can be used to determine how much over or under the ideal bid that the advertiser paid. Therefore, a positive regret metric means that the advertiser's ads have, on average, been overbid, and the total amount overpaid (or overbid) is the regret metric. A negative regret metric means that the advertiser's ads have, on average, been underbid, and the total amount under paid (or underbid) is the regret metric (or in this case possibly a success metric). In the case of underbidding, the ad may not have won the auction, in which case there may be no regret metric calculated.

The ad performance module 235 determines an ideal bid amount of an ad campaign while the budget is still being spent based on the performance information of the ad campaign, the budget of the ad campaign, the lifetime of the ad campaign, and any combination thereof. For example, the ideal bid amount can be a weighted average of the bid amounts of the ads entered in ad selection processes to date or over the total lifetime of the campaign or over some other time period (e.g., the course of a day or a week). The average bid may not necessarily be the ideal bid, but is a reasonable proxy for the ideal bid. In one embodiment, a higher bid amount of an ad is assigned a higher weight, reflecting a higher likelihood that the ad will win an ad selection process. The ad performance module 235 can also provide this information for display to the advertiser as feedback regarding to indicate performance of the ad campaign. For example, the ad performance module 235 can provide this information for presentation in a user interface associated with an ad campaign that provides various statistics about the ad campaign and allows the advertiser to manage the campaign. The regret metric is tied to advertiser spend and directly tracks how much is lost by the advertiser. The regret metric is directly related to return-on-investment, so the advertiser can use this metric to determine the value of an ad campaign and the advertiser ROI for each campaign. The regret metric can also be fed back into the bidding module 232 to adjust future bidding to get closer to the ideal or equilibrium bid.

The web server 240 links the ad system 140 via the network 120 to the one or more client devices 110, as well as to the one or more third party systems 130. The web server 140 serves web pages, as well as other web-related content, such as JAVA®, FLASH®, XML and so forth. The web server 240 may receive and route messages between the ad system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 110. Additionally, the web server 240 may provide application programming interface (API) functionality to send data directly to native client device operating systems, such as IOS®, ANDROID™, WEBOS® or RIM®. The web server can provide the user interface mentioned above including the regret metric allowing the advertiser to track ad campaign performance.

Providing a Regret Metric for Advertisements

Figure 3:
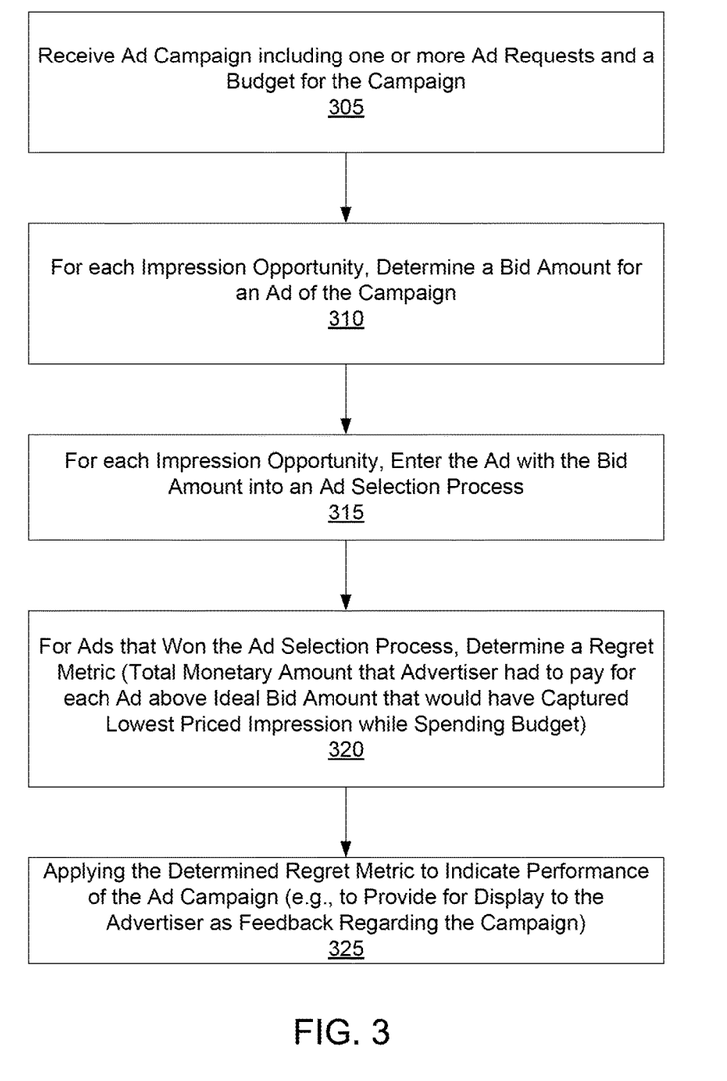
FIG. 3 is a flow chart of a method for providing feedback of advertisements based on a regret metric, in accordance with an embodiment.

FIG. 3 is a flow chart of one embodiment of a method for providing a regret metric for advertisements. In various embodiments, the steps described in conjunction with FIG. 3 may be performed in different orders. Additionally, in some embodiments, the method may include different and/or additional steps than those shown in FIG. 3. The functionality described in conjunction with the ad system 140 in FIG. 3 may be provided by the bidding module 232, ad performance module 235, web server 240, etc. in one embodiment, or may be provided by any other suitable component, or components, in other embodiments. Additionally, the client device 110 may execute one or more instructions associated with the ad system 140, such as an application associated with the ad system 140, to provide the functionality described in conjunction with FIG. 3.

The ad system 140 receives 305 information for an ad campaign that includes one or more ad requests and a budget for the campaign. Some or all of the information for the ad campaign can be provided to the ad system by the advertiser or an entity associate with the advertiser. The campaign can include other information describing the campaign too, such as the ad creative, targeting criteria for the ad, the lifetime of the campaign. An ad creative is content of the ad presented to an ad system user when the ad is displayed. The budget specifies an amount of money that the advertiser wished to spend for presentation of ads of the ad campaign. The lifetime of an ad campaign is a duration or interval of time over which ads in the ad campaign are presented to users of the ad system 140. In other embodiments, the lifetime can be based on when a conditional state is met such as when the budget runs out, when a threshold number of users have been reached, or when the advertiser of the ad campaign requests that the ad campaign be shut down. The received ad campaign can also include bid amounts for the ads, where a bid amount is the amount an advertiser would like to present in an ad selection process for each ad and each type of impression opportunity. This can be, for example, a per click or per impression amount. Alternatively, the system can automatically determine the bid amount per impression opportunity, and this can even occur as each impression opportunity becomes available on the system. In this case, the system bids in accordance with the advertiser's stated budget.

For each of a plurality of impression opportunities or chances to present an ad of the campaign to a user of the ad system 140 (e.g., each time a user matching the targeting criteria for the ad becomes available on the system to receive an ad, and there is no other factor preventing or discouraging presentation such as a privacy setting or other ads related setting by the user), a bid amount is determined 310. For example, the bid amount for the ad can be determined 310 based on the advertiser's budget and lifetime of the ad campaign including the ad. If the ad campaign has a budget B to be spent within time T for X ads, the bid amount can be equal to or approximately B divided by X assigning an equal portion of the budget to each ad in X, B divided by T divided by X assigning an equal portion of the budget to each ad request in X given the time restraint of T, or any other suitable combination of B, T, and X. Similarly the system can use a more complicated algorithm for determining how much to bid for each impression opportunity depending on how valuable the opportunity is (e.g., how closely the user matches the ad's targeting criteria), how likely the user is to click on the ad (e.g., based on prior click history, anticipated interest of the user in the ad, association of the ad with the user's friends on the system, etc.), how the system wishes to pace out the advertiser's budget over the course of the day, the systems prior knowledge or history of what times of day the most valuable impression opportunities for this type of ad are likely to be available, among many other factors. Alternatively, the bid amount can be specified by an advertiser of an ad campaign.

For each of the impression opportunities for an ad of the campaign, the ad can be considered along with various other ads in an ad selection process. The ad is entered 315 into the ad selection process with the determined bid amount associated with the ad. The ad selection process selects an ad from the candidate ads for providing to the user associate with the impression opportunity. For example, the ad selection process is an auction process and the ad can be entered into the auction along with other ads for possible selection to be presented to the user. The ad with the highest bid may be the ad that is ultimately selected, though a variety of factors can be considered in the ad selection process, such as the interest of the user in the topic of the ad, the interest of the user in ads in general, the association of the ad with the user's social network of friends or connections, privacy or ads related settings of the user that may control whether and what types of ads can be presented, the ad slot available for the impression opportunity, the relationship between the ad and other content presented on the page to the user, among various other factors. Any one or more of these factors can result in certain ads being removed from the ad selection process before the final selection is made. Ultimately, an ad is selected to "win" the auction process, at least partly based on bid amounts associated with the ads in the auction.

For the impression opportunities in which an ad of the ad campaign at issue won the ad selection process and was provided for display to the user, the ad system 140 determines 320 a regret metric across the ad campaign. The regret metric is the total monetary amount that the advertiser had to pay for displaying the ad above the ideal bid or the bid that would have captured the lowest priced impressions during the campaign's life while spending the advertiser's budget, and not going below or above the budget (or going only a limited amount below or above).

In one embodiment, the ideal bid amount can be represented by an average bid amount for ads in the ad campaign (e.g., average pacing bid). This determination can be based on performance of other ad campaigns similar to the ad campaign, other ad campaigns of the advertiser associated with the ad campaign, or any other suitable performance information maintained by the ad system 140. In other embodiments, an ideal bid amount is determined based on the number of ads that have previously been entered in ad selection processes and the bid amounts of those ads. In one embodiment, the ideal bid amount is a weighted average of bid amounts where a higher weight is assigned to a bid amount based on the bid amount, a number of times ad selection processes were won with the bid amount, a difference between the bid amount and an actual winning bid amount of the ad selection process, a difference between the bid amount and the next highest bid amount, recency information associated with the bid amounts, or any combination thereof. For example, the ideal bid amount can be a weighted average of previous bid amounts of the ads in the ad campaign where the weight of a bid amount is proportional to the bid amount. Thus, a higher bid amount has a higher weight and this can be useful since it reflects the higher likelihood of an ad with the higher bid amount winning an ad selection process. Further, if the ad system 140 identifies better performance of ads when presented at a certain time interval, the ad system 140 can assign a higher weight to bid amounts entered in ad selection processes during that time interval.

One example of estimating the ideal paced bid for an ad campaign for use in determining the regret metric is provided below. Consider a given advertiser with a single day's campaign data, in which $B(t)$ is the budget consumed at time $t$, $B'(t)$ is the spend rate of the budget (e.g., rate of change per unit time), $b\_t$ is the bid (e.g., pacing multiplier applied in determining the bid amount) at time $t$, $p(b)$ is the average price changed for winning auctions at a pacing multiplier $b$, and $r(b)$ is the rate at which auctions are won at a pacing multiplier level $b$ (e.g., proportional to the probability that the ad gets selected and wins the auction downstream given the pacing multiplier applied upstream). The hypothetic ideal paced bid to be estimated is $b^*$. The goal is to compute $b^*$ using the observed data $b\_t$ and the sequence of multipliers $b\_t$ managed to successfully exhaust given the budget. Thus, $b^*$ is related to $b\_t$ since the integral of $B'(t)$ remains invariant between an ideal pacing run and the observed non ideal pacing data, and so $p(b^*) r(b^*)=\text{AVG}(p(b\_t) r(b\_t))$. Thus, to estimate the ideal paced bid, the system computes a weighted average of the observed prices paid by the advertiser with larger weights on the higher values (since $r(b)$ is increasing in $b$), and the equation presented above shows that using $b^*=\text{AVG}(b\_t)$ would result in an underestimate for the ideal paced bid (where $p(b)$ is assumed linear in $b$ and $r(b)$ is increasing in $b$).

The advertiser regret metric captures in the inefficiencies in the pacing system in dollar terms. For example, for advertiser $i$, where $b\_\{i,avg\}$ is the average paced bid through the course of the day, for each auction $j$ that the advertiser won, where $b\_\{i,j\}$ is the paced bid and $p\_\{i,j\}$ is the advertiser's price in the auction $j$, the regret metric is defined as:

$$\text{sum}\{j: p\_\{i,j\} > \{i,avg\}\}(p\_\{i,j\} - b\_\{i,avg\})$$

which is, for example the total payment made by the advertiser more than his equilibrium bid or ideal bid. When the metric goes to zero for an advertiser, pacing is doing an ideal job for the advertiser. The metric is dollarized and total loss is presented as a dollar term, capturing the direct advertiser impact. In some embodiments, the system sums the regret metric over various advertisers and computes the average loss-ratio (loss/revenue) for each advertiser and computes its average over advertisers (this is more fair to advertisers that are performing worse though with a small budget), and using log(revenue) weighting for each advertiser.

Feedback regarding the determined regret metric to indicate performance of the ad campaign is provided 325 for display to the advertiser. Advertisers can view performance of their ad campaigns and ads on a per-impression basis with the regret metric. For example, since the regret metric for an advertiser is a monetary amount directly reflecting how much overpaid for impressions, advertisers can be presented or have access to their regret metric for various ad campaigns allowing for per impression or per auction based updates of their ad campaigns' progress. This regret metric can be determined or presented at a rate specified by the advertiser or automatically at a predetermined rate (e.g., updated per auction entered, per auction won, per auction lost, per impression received, and any combination thereof).

The regret metric of an ad campaign shown to the advertiser of the ad campaign can be constantly or frequently updated. For example, responsive to an ad in the ad campaign winning an ad selection process, the regret metric of the ad campaign can be adjusted based on the ideal bid amount. The ad system 140 can also adjust the regret metric of the ad campaign responsive to wins and losses across the course of the ad campaign or can update only at the end of an ad campaign.

In various embodiments, the regret metric can also be used to adjust individual bid amounts of ads in the ad campaign. For example, if the regret metric of an advertiser of an ad campaign can reflecting overpaying on average for ad selection processes and so the bid amounts for future ads can be adjusted based on the regret metric.

In some embodiments, a new bid amount is determined for presentation of an ad to users of the ad system 140 based on the determined regret metric. Since the regret metric is a monetary amount representing how much the advertiser had to pay above the ideal, the regret metric can be used to decrease or otherwise tune bid amounts used in the ad campaign. Bid amounts can be tailored to be lower or closer to the ideal bid amount for the campaign. The new bid amount can also be determined based on received engagement information with a previously presented ad. Engagement information with a presented ad can be received by one or more users of the ad system 140 where the engagement information describes engagements with an ad by the one or more users of the ad system 140. Engagement with an ad includes interactions such as clicks on an ad, shares of an ad, likes of an ad, etc. In some embodiments, conversions or purchases made/actions taken based on an ad can also be considered. Based on the type of interaction received, a number of received engagements, or any combination thereof, the new bid amount can be increased or decreased. For example, an ad that was shared more than a threshold number of times would have a higher bid amount for certain impression opportunities than an ad was shared less than a threshold number of times.

CONCLUSORY STATEMENTS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, by an advertising ("ad") system, information regarding an advertisement campaign ("ad campaign") for an advertiser, the ad campaign including one or more advertisement requests ("ad requests") and a budget of the ad campaign;
   for each of a plurality of impression opportunities for presenting an ad of the ad campaign to a user of the ad system:
   determining, by the advertising system, a bid amount;
   entering, by the advertising system, the ad with the bid amount into an ad selection process;
   for the plurality of impression opportunities in which the ad was entered into the ad selection process, determining a regret metric across the ad campaign, the regret metric comprising a total monetary amount that the advertiser had to pay for the presentation of each ad above an ideal bid amount, the ideal bid amount being a weighted average of bid amounts entered into the ad selection process, each weight value for a bid amount proportional to a combination of the bid amount, a number of times the ad selection process was won with the bid amount, a difference between the bid amount and an actual winning bid amount of the ad selection process, a difference between the bid amount and the next highest bid amount, and a recency of the bid amount; and
   providing for display to the advertiser feedback regarding the determined regret metric to indicate performance of the ad campaign.

2. The method of claim 1, wherein determining the bid amount further comprises applying a pacing algorithm to pace spending of the budget of the ad campaign over a period of time, and wherein the regret metric indicates an effectiveness of the pacing algorithm in pacing the budget.

3. The method of claim 1, wherein the ideal bid amount, if used as the bid amount, would have captured at least a threshold number of lowest priced impressions during a lifetime of the ad campaign, the threshold number of lowest priced impressions comprising all lowest priced impressions that were available during the lifetime of the ad campaign.

4. The method of claim 1, wherein the ideal bid amount, if used as the bid amount, would have captured at least a threshold number of lowest priced impressions during a lifetime of the ad campaign, the threshold number of lowest priced impressions comprising a majority of the lowest priced impressions that were available during the lifetime of the ad campaign.

5. The method of claim 1, wherein the ideal bid amount, if used as a bid amount, would have spent the budget of the advertiser for the ad campaign perfectly such that the spending neither goes over or under the budget.

6. The method of claim 1, wherein the ideal bid amount, if used as the bid amount, would have spent the budget of the advertiser for the ad campaign within a threshold distance of perfect spending of the budget such that the spending neither goes over or under the budget.

7. The method of claim 1, further comprising applying the regret metric in improving bid amount determinations in future presentations of ads in the ad campaign or in future ad campaigns.

8. The method of claim 1, wherein the total monetary amount is a sum of the bid amounts that were paid by the advertiser each time the ad won the ad selection process and where the advertiser paid a price that was above what the advertiser would have paid had an ideal bid been used in the ad selection process.

9. A non-transitory computer readable storing medium storing computer program instructions, the instructions when executed by a processor causing the processor to:
  receive, by an advertising ("ad") system, information regarding an advertisement campaign ("ad campaign") for an advertiser, the ad campaign including one or more advertisement requests ("ad requests") and a budget of the ad campaign;
  for each of a plurality of impression opportunities for presenting an ad of the ad campaign to a user of the ad system:
  determine, by the advertising system, a bid amount;
  enter, by the advertising system, the ad with the bid amount into an ad selection process;
  for the plurality of impression opportunities in which the ad was entered into the ad selection process, determine a regret metric across the ad campaign, the regret metric comprising a total monetary amount that the advertiser had to pay for the presentation of each ad above an ideal bid amount, the ideal bid amount being a weighted average of bid amounts entered into the ad selection process, each weight value for a bid amount proportional to a combination of the bid amount, a number of times the ad selection process was won with the bid amount, a difference between the bid amount and an actual winning bid amount of the ad selection process, a difference between the bid amount and the next highest bid amount, and a recency of the bid amount; and
  provide for display to the advertiser feedback regarding the determined regret metric to indicate performance of the ad campaign.

10. The computer readable storing medium of claim 9, wherein the instructions when executed by a processor causing the processor to determine the bid amount further comprise instructions when executed by a processor causing the processor to apply a pacing algorithm to pace spending of the budget of the ad campaign over a period of time, and wherein the regret metric indicates an effectiveness of the pacing algorithm in pacing the budget.

11. The computer readable storing medium of claim 9, wherein the ideal bid amount, if used as the bid amount, would have captured at least a threshold number of lowest priced impressions during a lifetime of the ad campaign, the threshold number of lowest priced impressions comprising all lowest priced impressions that were available during the lifetime of the ad campaign.

12. The computer readable storing medium of claim 9, wherein the deal bid amount, if used as the bid amount, would have captured at least a threshold number of lowest priced impressions during a lifetime of the ad campaign, the threshold number of lowest priced impressions comprising a majority of the lowest priced impressions that were available during the lifetime of the ad campaign.

13. The computer readable storing medium of claim 9, wherein the ideal bid amount, if used as a bid amount, would have spent the budget of the advertiser for the ad campaign perfectly such that the spending neither goes over or under the budget.

14. The computer readable storing medium of claim 9, wherein the ideal bid amount, if used as a bid amount, would have spent the budget of the advertiser for the ad campaign within a threshold distance of perfect spending of the budget such that the spending neither goes over or under the budget.

15. The computer readable storing medium of claim 9, further comprising instructions when executed by a processor causing the processor to apply the regret metric in improving bid amount determinations in future presentations of ads in the ad campaign or in future ad campaigns.

16. The computer readable storing medium of claim 9, wherein the total monetary amount is a sum of the bid amounts that were paid by the advertiser each time the ad won the ad selection process and where the advertiser paid a price that was above what the advertiser would have paid had an ideal bid been used in the ad selection process.

17. The method of claim 1, wherein the display of the feedback to the advertiser includes a presentation of the regret metric for each of one or more advertising campaigns of the advertiser a performance of one or more ad campaigns on a per-impression basis with the regret metric, wherein the regret metric is presented at a rate specified by the advertiser.

18. The method of claim 1, wherein the weight value for the bid amount is directly proportional to the combination, and wherein the combination includes a product.

* * * * *

UNITED STATES PATENT AND TRADEMARK OFFICE
CERTIFICATE OF CORRECTION

PATENT NO. : 10,445,788 B2
APPLICATION NO. : 14/941329
DATED : October 15, 2019
INVENTOR(S) : Anand Sumatilal Bhalgat et al.

It is certified that error appears in the above-identified patent and that said Letters Patent is hereby corrected as shown below:

In the Claims

Column 16, Line 4, Claim 10, before "computer" insert -- non-transitory --.

Column 16, Line 12, Claim 11, before "computer" insert -- non-transitory --.

Column 16, Line 18, Claim 12, before "computer" insert -- non-transitory --.

Column 16, Line 25, Claim 13, before "computer" insert -- non-transitory --.

Column 16, Line 30, Claim 14, before "computer" insert -- non-transitory --.

Column 16, Line 35, Claim 15, before "computer" insert -- non-transitory --.

Column 16, Line 40, Claim 16, before "computer" insert -- non-transitory --.

Signed and Sealed this
Thirtieth Day of June, 2020

Andrei Iancu
*Director of the United States Patent and Trademark Office*